US010354656B2

(12) United States Patent
Zhao et al.

(10) Patent No.: US 10,354,656 B2
(45) Date of Patent: Jul. 16, 2019

(54) SPEAKER RECOGNITION

(71) Applicant: Microsoft Technology Licensing, LLC, Redmond, WA (US)

(72) Inventors: Yong Zhao, Bellevue, WA (US); Jinyu Li, Redmond, WA (US); Yifan Gong, Sammamish, WA (US); Shixiong Zhang, Redmond, WA (US); Zhuo Chen, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/631,995

(22) Filed: Jun. 23, 2017

(65) Prior Publication Data

US 2018/0374486 A1 Dec. 27, 2018

(51) Int. Cl.
*G10L 17/22* (2013.01)
*G10L 17/18* (2013.01)
*G10L 17/04* (2013.01)
*G10L 17/02* (2013.01)
*G10L 15/16* (2006.01)
*G10L 15/02* (2006.01)
*G10L 15/00* (2013.01)
*G10L 17/00* (2013.01)

(52) U.S. Cl.
CPC .............. *G10L 17/18* (2013.01); *G10L 15/16* (2013.01); *G10L 17/005* (2013.01); *G10L 17/04* (2013.01); *G10L 17/22* (2013.01); *G10L 17/02* (2013.01); *G10L 2015/025* (2013.01)

(58) Field of Classification Search
CPC ....... G10L 15/00; G10L 15/02; G10L 15/025; G10L 15/06; G10L 15/063; G10L 15/0631; G10L 15/065; G10L 15/07; G10L 15/075; G10L 15/16; G10L 17/00; G10L 17/005; G10L 17/04; G10L 17/06; G10L 17/14; G10L 17/18
USPC ....... 704/231, 232, 236, 238, 239, 240, 244, 704/245, 246, 247, 249, 250
See application file for complete search history.

(56) References Cited

U.S. PATENT DOCUMENTS

| 4,773,093 A | 9/1988 | Higgins et al. |
| 7,447,633 B2 | 11/2008 | Navratil et al. |
| 8,209,174 B2 | 6/2012 | Al-Telmissani |
| 8,560,316 B2 | 10/2013 | Vogt et al. |

(Continued)

OTHER PUBLICATIONS

Campbell, Joseph P., "Speaker Recognition: A Tutorial", In Proceedings of the IEEE, vol. 85, No. 9, Sep. 1997, pp. 1437-1462.

(Continued)

*Primary Examiner* — Paras D Shah
(74) *Attorney, Agent, or Firm* — Merchant & Gould

(57) ABSTRACT

Improvements in speaker identification and verification are provided via an attention model for speaker recognition and the end-to-end training thereof. A speaker discriminative convolutional neural network (CNN) is used to directly extract frame-level speaker features that are weighted and combined to form an utterance-level speaker recognition vector via the attention model. The CNN and attention model are join-optimized via an end-to-end training algorithm that imitates the speaker recognition process and uses the most-similar utterances from imposters for each speaker.

19 Claims, 7 Drawing Sheets

(56) References Cited

U.S. PATENT DOCUMENTS

| | | | |
|---|---|---|---|
| 8,694,317 B2 | 4/2014 | Skilling et al. | |
| 9,489,950 B2 | 11/2016 | Larcher et al. | |
| 9,824,692 B1* | 11/2017 | Khoury | G10L 17/08 |
| 2008/0172230 A1* | 7/2008 | Hayakawa | G10L 17/14 |
| | | | 704/249 |
| 2011/0301949 A1* | 12/2011 | Ramalho | G10L 15/075 |
| | | | 704/231 |
| 2013/0006633 A1* | 1/2013 | Grokop | G10L 15/063 |
| | | | 704/245 |
| 2014/0195236 A1* | 7/2014 | Hosom | G10L 17/18 |
| | | | 704/249 |
| 2015/0032449 A1 | 1/2015 | Sainath et al. | |
| 2015/0112684 A1* | 4/2015 | Scheffer | G10L 17/14 |
| | | | 704/257 |
| 2015/0127336 A1* | 5/2015 | Lei | G10L 17/18 |
| | | | 704/232 |
| 2015/0149165 A1* | 5/2015 | Saon | G10L 15/063 |
| | | | 704/232 |
| 2015/0161522 A1 | 6/2015 | Saon et al. | |
| 2015/0161995 A1 | 6/2015 | Sainath et al. | |
| 2015/0269931 A1* | 9/2015 | Senior | G10L 15/063 |
| | | | 704/245 |
| 2016/0293167 A1* | 10/2016 | Chen | G10L 17/18 |
| 2016/0314790 A1* | 10/2016 | Tsujikawa | G10L 17/06 |
| 2016/0365096 A1* | 12/2016 | Bocklet | G10L 17/04 |
| 2016/0372116 A1* | 12/2016 | Summerfield | G10L 25/63 |
| 2018/0012602 A1* | 1/2018 | Komissarchik | G10L 17/24 |

OTHER PUBLICATIONS

Auckenthaler, et al., "Improving a GMM speaker verification system by phonetic weighting", In Proceedings of IEEE International Conference on Acoustics, Speech, and Signal Processing, vol. 1, Mar. 15, 1999, 4 pages.

Matsui, et al., "A text-independent speaker recognition method robust against utterance variations", In Proceedings of International Conference on Acoustics, Speech, and Signal Processing, Apr. 14, 1991, pp. 377-380.

Larcher, et al., "Text-dependent speaker verification: Classifiers, databases and rsr2015", In Journal of Speech Communication, vol. 60, May 2014, pp. 56-77.

Heigold, et al., "End-to-end text-dependent speaker verification", In Proceedings of International Conference on Acoustics, Speech and Signal Processing, Mar. 20, 2016, 5 pages.

Variani, et al., "Deep neural networks for small footprint text-dependent speaker verification", In Proceedings of IEEE International Conference on Acoustic, Speech and Signal Processing, May 4, 2014, pp. 4052-4056.

Reynolds, Douglas A., "Speaker identification and verification using Gaussian mixture speaker models", In Journal of Speech Communications, vol. 17, Issue 1-2, Aug. 1995, pp. 91-108.

Kenny, et al., "Joint factor analysis versus eigenchannels in speaker recognition", In Proceedings of IEEE Transactions on Audio, Speech, and Language Processing, vol. 15, Issue 4, May 2007, pp. 1435-1447.

Novoselov, et al., "Text-dependent GMM-JFA system for password based speaker verification", In Proceedings of IEEE International Conference on Acoustics, Speech and Signal Processing, May 4, 2014, pp. 729-737.

Zhang, et al., "Optimized discriminative kernel for SVM scoring and its application to speaker verification", In Proceedings of IEEE Transactions on Neural Networks, vol. 22, No. 2, Feb. 2011, pp. 1-13.

Stafylakis, et al., "Text-dependent speaker recognition using plda with uncertainty propagation", In Journal of Matrix, vol. 500, 2013, 5 pages.

Lei, et al., "A novel scheme for speaker recognition using a phonetically-aware deep neural network", In Proceedings of IEEE International Conference on Acoustics, Speech and Signal Processing, May 4, 2014, pp. 1695-1699.

Bhattacharya, et al., "Deep neural network based text-dependent speaker Recognition: Preliminary results", In Proceedings of Odyssey: the Speaker and Language Recognition Workshop, Jun. 21, 2016, pp. 9-15.

Richardson, et al., "Deep neural network approaches to speaker and language recognition", In Proceedings of IEEE Signal Processing Letters, vol. 22, No. 10, Oct. 2015, pp. 1671-1675.

Zeinali, et al., "Deep Neural Networks and Hidden Markov Models in i-vector-based Text-Dependent Speaker Verification", In Proceedings of Odyssey: The Speaker and Language Recognition Workshop, Jun. 21, 2016, pp. 24-30.

Dehak, et al., "Cosine similarity scoring without score normalization techniques", In Proceedings of Odyssey: The Speaker and Language Recognition Workshop, Jun. 2010, 5 pages.

Kenny, et al., "Plda for Speaker Verification With Utterances of Arbitrary Duration", In Proceedings of IEEE International Conference on Acoustics, Speech and Signal Processing, May 26, 2013, 5 pages.

Sercu, et al., "Advances in very deep convolutional neural networks for LVCSR", In Journal of the Computing Research Repository, Apr. 2016, 5 pages.

Saon, et al., "The IBM 2015 English Conversational Telephone Speech Recognition System", In Journal of the Computing Research Repository, May 2015, 5 pages.

Dehak, et al., "Front-end factor analysis for speaker verification", In Proceedings of IEEE Transactions on Audio, Speech, and Language Processing, vol. 19, No. 4, May 2011, pp. 788-798.

Richardson, et al., "A unified deep neural network for speaker and language recognition", In Journal of the Computing Research Repository, Apr. 2015, 5 pages.

Dahl, et al., "Context-Dependent Pre-Trained Deep Neural Networks for Large-Vocabulary Speech Recognition", In Proceedings of IEEE Transactions on Audio, Speech, and Language Processing, vol. 20, No. 1, Jan. 2012, pp. 30-42.

Chen, et al., "Small-Footprint Keyword Spotting Using Deep Neural Networks", In Proceedings of IEEE International Conference on Acoustics, Speech and Signal Processing, May 4, 2014, 5 pages.

Fu, et al., "Tandem deep features for text-dependent speaker verification", In Proceedings of 15th Annual Conference of the International Speech Communication Association, Sep. 14, 2014, pp. 1327-1331.

Grezl, et al., "Probabilistic and bottle-neck features for LVCSR of meetings", In Proceedings of IEEE International Conference on Acoustics, Speech and Signal Processing, vol. 4, Apr. 15, 2007, pp. 757-760.

Zhu, et al., "Tandem connectionist feature extraction for conversational speech recognition", In Proceedings of the First international conference on Machine Learning for Multimodal Interaction, Jun. 21, 2004.

Zhang, et al., "Speaker verification via high-level feature based phonetic-class pronunciation modeling", In Proceedings of IEEE Transactions on Computers, vol. 56, Issue 9, Sep. 2007, pp. 1-10.

Simonyan, et al., "Very deep convolutional networks for large-scale image recognition", In Proceedings of International Conference on Learning Representations, May 7, 2015, pp. 1-14.

Ioffe, et al., "Batch normalization: Accelerating deep network training by reducing internal covariate shift", In Journal of the Computing Research Repository, Feb. 11, 2015, pp. 1-11.

Vinyals, et al., "Show and tell: A neural image caption generator", In Proceedings of the IEEE Conference on Computer Vision and Pattern Recognition, Jun. 7, 2015, pp. 3156-3164.

Al-Rfou, et al., "Theano: A Python framework for fast computation of mathematical expressions", In Journal of the Computing Research Repository, May 2016, pp. 1-19.

Lee, Taehoon, "GitHub—fchollet keras", https://github.com/fchollet/keras, Retrieved on: May 31, 2017, 4 pages.

Pelecanos, et al., "Feature warping for robust speaker verification", In Proceedings of a Speaker Odyssey—The Speaker Recognition Workshop, Jun. 18, 2001, 6 pages.

Abdel-Hamid, et al., "Convolutional Neural Networks for Speech Recognition", In Proceedings of IEEE/ACM Transactions on Audio,

(56) References Cited

OTHER PUBLICATIONS

Speech, and Language Processing, vol. 22, No. 10, Oct. 2014, pp. 1-13.

* cited by examiner

MOBILE COMPUTING DEVICE

SPEAKER RECOGNITION

BACKGROUND

Both speaker identification and speaker verification are challenging problems facing systems that use audio signals (e.g., speech) for knowing when to accept audio input to control the system and from what sources to accept such audio input. Speaker identification requires the system to identify a given speaker against other speakers and potential background noise (e.g., a radio or television playing in the background). Speaker verification requires the system to verify whether a given speaker matches a known user. Prior solutions to speaker identification/verification require large expenditures of processing resources, specific utterances, expensive training periods, and are often inaccurate.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

Systems, methods, and computer readable storage devices embodying instructions for providing an attention model trained as an end-to-end system for speaker recognition are provided herein. Models are trained for users onboarded with the system using training utterances that are similar to the user's onboarding utterances, in which the phonemes and vocal patterns of the utterances are analyzed in combination. The phonetic analysis enables user recognition to be aligned based on what is being said, allowing for both text-dependent and text-independent systems to more reliably match segments of utterances for training or comparison. The models are subject to end-to-end training so that all the components used to recognize known users via their speech patterns are trained together to provide an output of whether a given utterance originates from a known speaker or from an unrecognized speaker.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
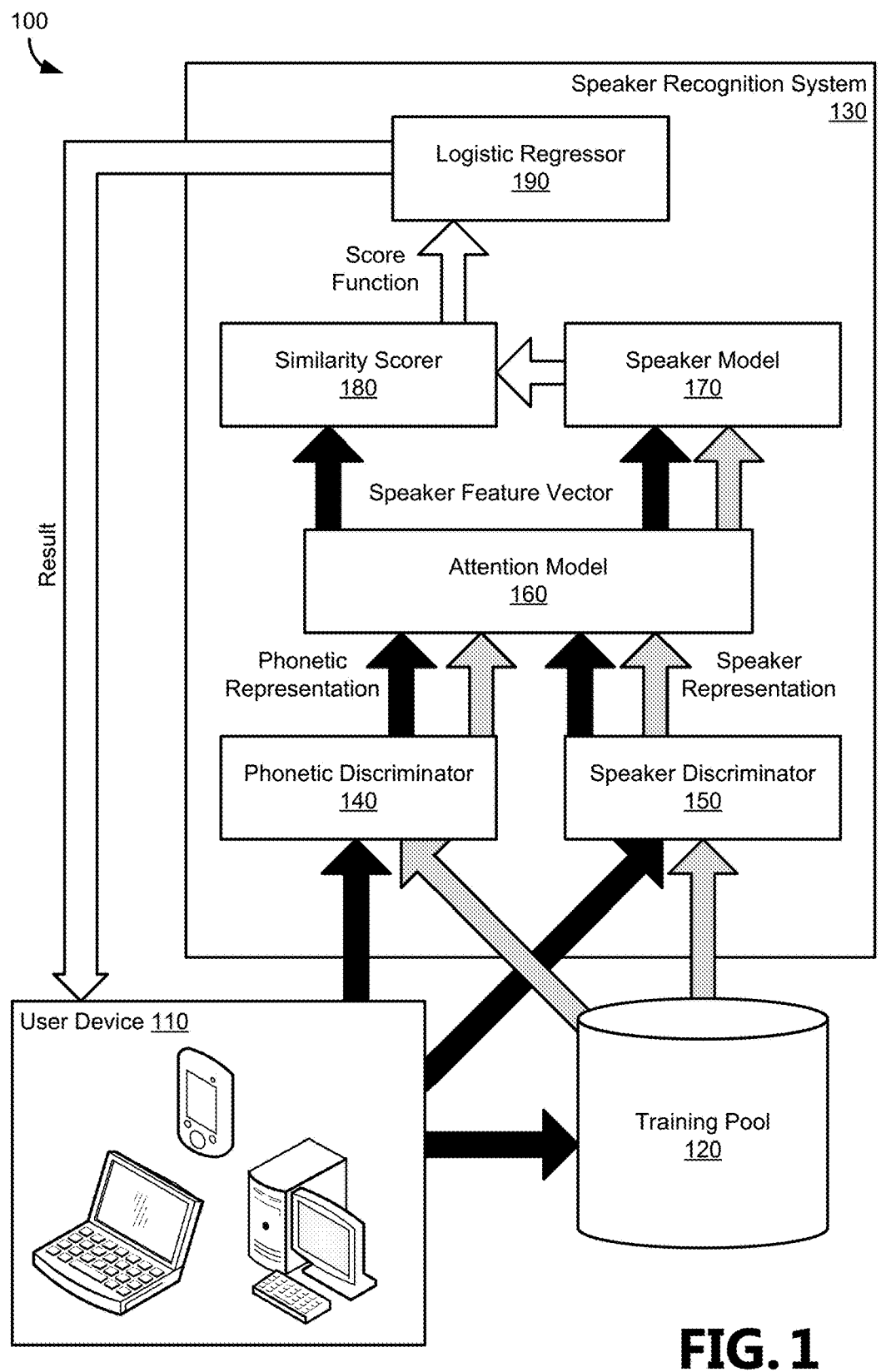
FIG. 1 illustrates an example operating environment in which the present disclosure may be practiced.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

As used in the present disclosure, some examples are given using the International Phonetic Alphabet (IPA), which are distinguished from the rest of the text via inclusion in curled brackets "{" and "}". For example, the word 'hello' may be presented in a variety of ways depending on the speaker's pronunciation via IPA, including, but limited to {həˈloʊ}, {hɛˈloʊ}, and {həˈloʊ}.

Systems, methods, and computer readable storage devices embodying instructions for providing an attention model trained as an end-to-end system for speaker recognition are provided herein. Models are trained for users onboarded with the system using training utterances that are similar to the user's onboarding utterances, in which the phonemes and vocal patterns of the utterances are analyzed in combination. The phonetic analysis enables user recognition to be aligned based on what is being said, allowing for both text-dependent and text-independent systems to more reliably match segments of utterances for training or comparison. For example, an utterance of "a-b-c" is received from speaker A, and an utterance of "b-c-d" is received from speaker B, the sections of the utterances for 'b' and 'c' can be aligned for comparison to determine whether speaker A and speaker B are the same person.

The models are subject to end-to-end training so that all the components used to recognize known users via their speech patterns are trained together to provide an output of whether a given utterance originates from a known speaker or from an unrecognized speaker. The phonetic information is combined with the speaker representation, to form a standard speaker vector. In one aspect, for each utterance the tensor product between the phonetic and the speaker representations is used to form a text-independent speaker representation, where each phoneme has a corresponding speaker representation. In another aspect, an attention model is used to learn weights to apply to different phonemes in a given utterance, as the system is operable to learn which phonemes carry higher (or lower) amounts of information to discriminate between different speakers. The weights indicate positions in the utterance where greater attention is to be paid in order to identify separate speakers. After generating the speaker representation, an objective function is used as the training criteria for the whole system to directly optimize the verification error, leading to the end-to-end system.

FIG. 1 illustrates an example operating environment 100 in which the present disclosure may be practiced. As illustrated, a user device 110 provides utterances from a user to a database maintaining a training pool 120 and to a speaker recognition system 130 to develop a speaker model 170 and receive recognition results. The speaker recognition system 130 receives utterances from the user device 110 and test utterances from the training pool 120 to provide a training dataset against which to train a speaker model 170 for recognizing the user from the user's utterances.

The user device 110, training pool 120, and speaker recognition system 130 are illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, printers, and mainframe computers. The hardware of these computing systems is discussed in greater detail in regard to FIGS. 4-6.

While the user device 110, training pool 120, and speaker recognition system 130 are shown remotely from one another for illustrative purposes, it should be noted that several configurations of one or more of these devices hosted locally to another illustrated device are possible, and each illustrated device may represent multiple instances of that device. Various servers and intermediaries familiar to those of ordinary skill in the art may lie between the component systems illustrated in FIG. 1 to route the communications between those systems, which are not illustrated so as not to distract from the novel aspects of the present disclosure.

The speaker recognition system 130 is responsible for one or more of speaker identification and speaker verification based on utterances received from the user device 110 as well as utterances received from other speakers maintained in the training pool 120. For ease of understanding, data based on utterances received from the user device 110 are shown in FIG. 1 as black arrows, whereas data based on utterances received from the training pool 120 are shown represented by gray arrows. Arrows shown in white in FIG. 1 represent data based on both the utterances received from the user device 110 and from the training pool 120.

Utterances received from the user device 110 include both enrollment utterances and operational utterances. Enrollment utterances are used in combination with training utterances (from the training pool 120) to train a speaker model 170 for a given user to discriminate between various users based on their speech patterns. The operational utterances are compared against the trained speaker model 170 by the speaker recognition system 130 once the training phase is complete so that users can be identified and verified to allow the user device 110 to accept audio command inputs from known users.

In various aspects, the speaker model 170 is text-dependent and in other aspects is text-independent. A text-dependent model is trained against various key phrases or activation commands from a limited set to initiate user identification or verification on the user device 110, whereas a text-independent model accepts natural language enrollment phrases and is not confined to a limited set. For example, a user may be required to provide several enrollment utterances of "Hello HAL" to train a text-dependent model for a digital assistant dubbed "HAL" using the key phrase of "Hello HAL" to activate or initiate a command. The phonemes analyzed in the text-dependent system will include those phonemes used in pronouncing the key phrase. In contrast, a user training a text-independent model provides several enrollment utterances, (e.g., "Hello HAL," "Open the pod bay doors", "Sing it for me"), which optionally include or exclude any key phrases used by the speaker recognition system 130 and will include an analysis of a given or selected language's set of phonemes rather than using a set of phonemes defined in a phrase.

Each of the speaker discriminator 150, attention model 160, and regressor 190 are trained via various machine learning techniques for a given user profile to recognize whether utterances are from the user associated with the speaker model 170 or from other speakers. The phonetic discriminator 140 and similarity scorer 180 are trained via various machine learning techniques for a given language—and may be trained separately and before the speaker discriminator 150, attention model 160, and regressor 190 are trained for specific users. Machine learning techniques train models to accurately make predictions on data fed into the models (e.g., whether an utterance was made by a recognized speaker; whether a noun is a person, place, or thing; what the weather will be like tomorrow). During a learning phase, the models are developed against a training dataset of known inputs (e.g., sample A, sample B, sample C) to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs, in which the training dataset is repeatedly fed into the model to refine its results. For example, in a supervised learning phase, a model is developed to predict the output for a given set of inputs, and is evaluated over several epochs to more reliably provide the output that is specified as corresponding the given input for the greatest number of inputs for the training dataset. In another example, for an unsupervised learning phase, a model is developed to cluster the dataset into n groups, and is evaluated over several epochs in how consistently it places a given input into a given group and how reliably it produces the n desired clusters across each epoch.

Once an epoch is run, the models are evaluated and the values of their variables are adjusted to attempt to better refine the model. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, etc.

The model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the nth epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. Models that are finalized are evaluated against testing criteria. In a first example, a testing dataset that includes known outputs for its inputs is fed into the finalized models to determine an accuracy of the model in handling data that is has not been trained on. In a second example, a false positive rate, false negative rate may be used to evaluate the models after finalization. In a third example, a delineation between clusterings is used to select a model that produces the clearest bounds for its clusters of data.

Utterances from the user device 110 are transmitted to the training pool 120 in addition to the speaker recognition system 130. The training pool 120 includes a plurality of utterances from a plethora of speakers gathered over time, and the user's utterances are optionally retained for use as training data for other users. In some aspects, the training pool 120 is in communication with or incorporates a speaker recognition system 130 to identify test utterances that are similar to the user's test utterance (e.g., those that include the same phonemes, those with speaker feature vectors with similar values). The training pool 120 supplies the speaker recognition system 130 with training data during a machine learning training phase, and in some aspects selects the training utterances to supply based on their similarity to the onboarding utterances received. For example, a most competing/most similar speaker from the training pool 120 is selected to compare against the set of onboarding utterances from the user.

The phonetic discriminator 140 receives utterances from the user device 110 and, during a training phase, from the training pool 120 to identify the various phonemes (including silences) present in the utterance, thus producing phonetic representations of the utterance at a frame level. In various aspects, a frame is a predefined length of time in an audio signal, such as, for example, 5, 10, 15, or n ms. The recognized phonemes are used in various aspects to determine what the speaker is saying in an utterance, for example, to determine whether a key phrase is present, to identify the content of a command or query, or to align or normalize utterances from different speakers for comparison.

In some aspects, the phonetic discriminator 140 uses a bottleneck approach to identify phonemes, producing bottleneck features $b_t$ from a trained neural network for each frame t as phonetic representations of those frames. In other aspects, the phonetic representations for the frames are produced from posterior features $\gamma_t$ for each frame t that provide statistical likelihoods that the frame t contains various phonemes. The phonetic representations produced for the user's utterance (and the training utterances, during a training phase) are then passed to the attention model 160.

The speaker discriminator 150 receives utterances from the user device 110 and, during a training phase, from the training pool 120 to identify various speaker representations. Similarly to the phonetic discriminator 140, the speaker discriminator 150 also breaks down utterances at the frame level. The speaker discriminator 150 is trained to distinguish between speakers based on differences in articulation, frequency, rate, etc. and utterance-level averages of those values between speakers. As discussed herein, the average of a given value or set of values across the frames of an utterance is referred to as a d-vector. For example, a user's frequency of voice will vary during the course of an utterance, but an average voice frequency value may be included in a d-vector for the utterance. The speaker representations produced for the user's utterance (and the training utterances, during a training phase) are then passed to the attention model 160.

The phonetic discriminator 140 and speaker discriminator 150 include or are trained by a Neural Network (e.g., deep learning, deep convolutional, or recurrent neural networks), which comprises a series of "neurons," such as Long Short Term Memory (LSTM) nodes, arranged into a network. A neuron is an architecture used in data processing and artificial intelligence, particularly machine learning, that includes memory that may determine when to "remember" and when to "forget" values held in that memory based on the weights of inputs provided to the given neuron. Each of the neurons used herein are configured to accept a predefined number of inputs from other neurons in the network to provide relational and sub-relational outputs for the content of the frames being analyzed. Individual neurons may be chained together and/or organized into tree structures in various configurations of neural networks to provide interactions and relationship learning modeling for how each of the frames in an utterance are related to one another.

For example, an LSTM serving as a neuron includes several gates to handle input vectors (e.g., phonemes from an utterance), a memory cell, and an output vector (e.g., contextual representation). The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation. One of skill in the art will appreciate that neurons and neural networks may be constructed programmatically (e.g., via software instructions) or via specialized hardware linking each neuron to form the neural network.

In one aspect, the speaker discriminator 150 includes neurons configured to accept inputs asymmetrically from frames of an utterance. For example, a given neuron may accept inputs from up to the prior 30 frames, but accept inputs from only up to the subsequent 5 frames, thus reducing latency in analyzing a given utterance by requiring fewer subsequent frames than prior frames for analysis. In some aspects, neurons representing utterances and the beginning or the end of an utterance are zero-padded to account for less than all of the inputs being available for the given neuron.

The attention model 160 receives the phonetic representations and speaker representations from the phonetic discriminator 140 and the speaker discriminator 150 respectively. During a training phase, the attention model 160 receives representations based on enrollment utterances as well as training utterances, and during normal operation will receive operational utterances from the user device 110. The attention model 160 is trained during the training phase to serve as a selection and combination model to generate a speaker feature vector that describes the utterances of a speaker in a given context. Generally, the attention model 160 accepts a series of arguments and a context as input to return a speaker feature vector of a weighted mean of each argument based on the context.

In various aspects, the attention model 160 is trained with posterior weights or learned weights. The weights are based on the relevance of each input frame in a given context, where the arguments are the speaker representations for a given frame and the contexts are a corresponding frame from the phonetic representations. As discussed herein, for T frames in an utterance, the speaker representations for a given frame are referred to as $h_t \in h_1 - h_T$ and the probability that a given frame includes a given phoneme are referred to as $\gamma_t \in \gamma_1 - \gamma_T$. Each speaker representation argument $h_t$ is an X-dimension feature for each frame, where X is based on the output of the speaker discriminator 150 (e.g., 64-dimensions). In a text-dependent model, each phonetic probability $\gamma_t$ has N dimensions, where N is the number of distinct phonemes in the limited set, whereas in a text-independent model, each phonetic probability $\gamma_t$ has M dimensions, where M is the number of distinct phonemes that the phonetic discriminator 140 is capable of recognizing.

In a posterior weighted aspect, the speaker feature vector $\int_{cnn|att}$ is produced according to FORMULA 1 as the sum of the Kronecker products of each frame 1 to T of the speaker representation $h_t$ and the phoneme probabilities $\gamma_t$ of that frame.

$$\int_{cnn|att} = \Sigma_{(1,T)}(h_t \otimes \gamma_t) \quad \text{FORMULA 1:}$$

In a learned weight aspect, the speaker vector is developed with different levels of attention weights given to different frames. Different frames of the utterance may contain different amounts of data that are useful for discriminating between different speakers, and therefore weights for the different frames are adjusted during a learning phase. Weights for speaker utterances for each frame $W_h$ and weights for bottleneck features in the neural network $W_b$ are developed and applied to speaker representations $h_t$ and phonetic bottleneck features $b_t$ respectively according to FORMULA 2, and the hyperbolic tangent thereof is taken to produce a natural weighting $e_t$ for each frame. An attention weighting $\alpha_t$ for each frame is then produced according to FORMULA 3 by raising e (Euler's number) to the power of $e_t$ for the given frame and dividing by the sum of e raised to the power of each natural weighting $e_{1-T}$. The attention weights $\alpha_t$ are a "soft-maxed" weighting of the natural weights $e_t$ for their given frames and provide a density weighting for the attention to pay to speaker information in a given frame of the utterance. These weights, $W_h$, $W_b$, $e_t$, and $\alpha_t$ are developed over the course of the learning phase to discriminate the user's onboarding utterances from similar utterances received from the training pool 120, and at least the attention weights $\alpha_t$ are stored in the speaker model 170 for the user upon conclusion of the learning phase.

$$e_t = \tan h(W_h h_t + W_b b_t) \quad \text{FORMULA 2:}$$

$$\alpha_t = \exp(e_t) \div \Sigma_{(1,T)} \exp(e_j) \quad \text{FORMULA 3:}$$

The developed attention weights $\alpha_t$ are used with the speaker vectors $h_t$ and the phoneme probability vectors $\gamma_t$ according to FORMULA 4 to produce the speaker feature vector $\int_{cnn|att}$, where the sum of the Kronecker products of each frame 1 to T of the speaker representation $h_t$ and the phoneme probabilities $\gamma_t$ are multiplied by the attention weight $\alpha_t$ for a given frame.

$$\int_{cnn|att} = \Sigma_{(1,T)}(\alpha_t \cdot h_t \otimes \gamma_t) \quad \text{FORMULA 4:}$$

The similarity scorer 180 compares the speaker feature vector $\int_{cnn|att}$ for operational utterances against the speaker feature vector(s) $\int_{cnn|att}$ stored in the speaker model 170 to determine whether the operational utterance is from a recognized speaker. In some aspects, a cosine similarity function is applied between a speaker feature vector from the speaker model 170 and the speaker feature vector from an operational utterance to produce a similarity score between the two. The logistic regressor 190 accepts the similarity score from the similarity scorer 180 and compares the similarity score against a recognition threshold. The value of the recognition threshold may be adjusted during a training phase of the speaker recognition system 130 or manually set by a user or administrator. If the similarity score satisfies the recognition threshold, the speaker from whom the operational utterance was received is recognized by the speaker recognition system.

In various aspects, an utterance is compared by the similarly scorer 180 against several speaker feature vectors stored in the speaker model 170 to identify whether the speaker is one of a set of previously onboarded users and if so, which user. For example, if Alice and Bob were onboarded as users with the speaker recognition system 130, the speaker model 170 will maintain a speaker feature vector for Alice $\int_{Alice}$ and a speaker feature vector for Bob $\int_{Bob}$. When an operational utterance is received from the user device 110, a speaker feature vector for the unrecognized speaker $\int_{speaker}$ is produced and compared against each of $\int_{Alice}$ and $\int_{Bob}$ to determine whether the speaker can be identified as either Alice or Bob. Once the speaker is identified (e.g., if $\int_{speaker}$ satisfies the threshold for similarity to $\int_{Alice}$ or $\int_{Bob}$) the speaker may then be verified on the user device 110, for example, to log Alice/Bob into the device, to accept a command issued by Alice/Bob, etc. The logistic regressor 190 transmits its determination of whether a user is identified and verified to the user device 110 as its result, to thereby enable the user device 110 to receive voice input from the recognized user.

Figure 2:
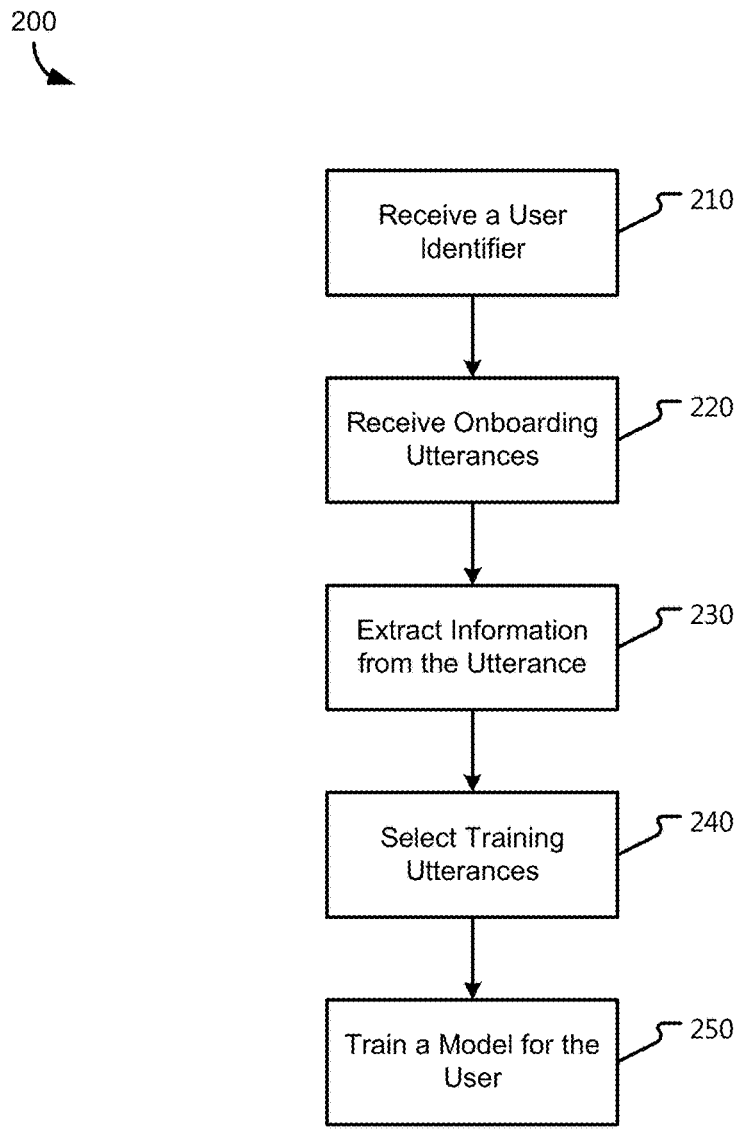
FIG. 2 is a flow chart showing general stages involved in an example method for speaker recognition.

FIG. 2 is a flow chart showing general stages involved in an example method 200 for speaker recognition, in which a speaker recognition system 130 is trained to produce a speaker model 170. Method 200 begins with OPERATION 210, where an identifier for the speaker model 170 is received, such as, for example, a username.

Proceeding to OPERATION 220, onboarding utterances are received from a speaker who is to be associated with the speaker model 170. In various aspects, the onboarding utterances are several repetitions of the same phrase, several different phrases selected for the speaker to repeat, or natural language phrases collected from the speaker over a length of time.

Information is extracted from the onboarding utterances to identify the user as a speaker at OPERATION 230. As discussed above, the utterances are analyzed on a frame-by-frame basis to produce phonetic representations and speaker representations for each frame that are used in an attention model 160 to develop a speaker model 170 for the user.

For the attention model 160 to be properly trained, however, several test utterances from other speakers must be provided from the training pool 120. The training utterances are selected from the utterances available in the training pool 120 at OPERATION 240. In various aspects, the test utterances are selected based on their similarity to the onboarding utterances to provide test utterances that are the most similar to the onboarding utterances to train the models against. The similarity of the training utterances is based, in various aspects, on one or more of the similarity of the phonetic representations (i.e., what phonemes the speaker used) and the speaker representations (i.e., how those phonemes were rendered) of those utterances.

Proceeding to OPERATION 250, a model is trained for the user based on the onboarding and training utterances. The onboarding and training utterances are used in several epochs of machine learning to develop a speaker model 170 that will discriminate utterances from the onboarded user from those submitted by other speakers, whose pronunciation and vocal patterns are similar to those of the onboarded user. In various aspects, the phoneme representations of the utterances are corresponded to one another, such that a first utterance having phonemes "a-b-c" will be compared to a second utterance having phonemes "b-c-d" will be compared against one another via shared phonemes (e.g., phoneme b::b and phoneme c::c), thus excluding portions of the utterances with non-shared phonemes (e.g., the portions corresponding to phonemes "a" and "d").

The speaker recognition system 130 is end-to-end trained for the user being onboarded; all of the parameters (weights, thresholds, etc.) are trained together for discriminating the user's utterances from those of imposters. The speaker model 170 is associated with the identifier for the user, so that once recognized by an utterance, the user can be identified and/or verified according to the identifier and its associated privileges.

Method 200 then concludes.

Figure 3:
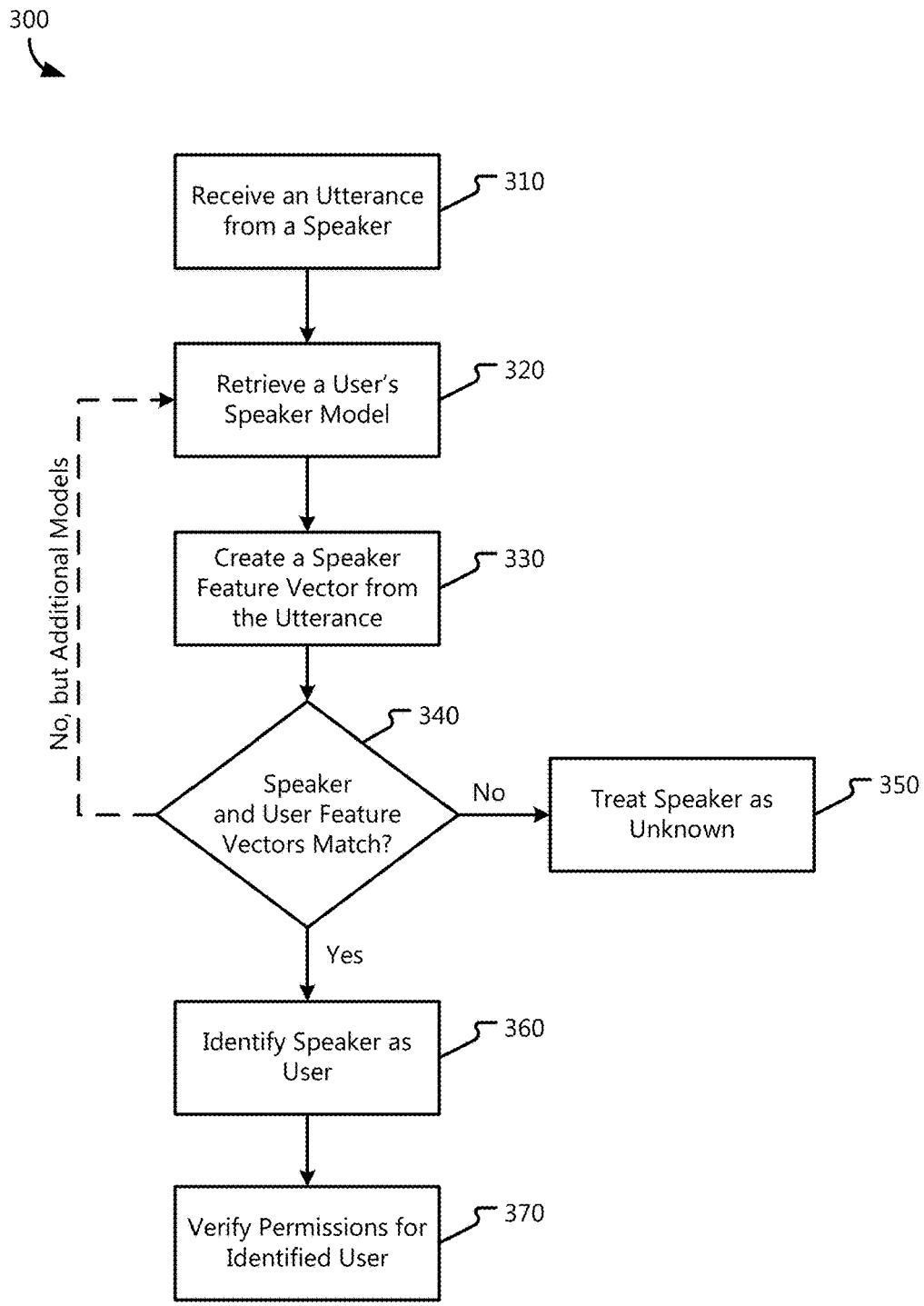
FIG. 3 is a flow chart showing general stages involved in an example method for speaker recognition.

FIG. 3 is a flow chart showing general stages involved in an example method 300 for speaker recognition, in which a speaker recognition system 130 is used to determine whether an utterance from a speaker is from a recognized user. Method 300 begins with OPERATION 310, where an operational utterance is received from a speaker. In various aspects, the utterance is a key phrase used to "wake up" a program or system using voice input, while in other aspects the utterance is natural language utterance that optionally includes or excludes key phrases.

At OPERATION 320 an onboarded user's speaker model 170 is retrieved. In various aspects, a speaker model 170 is selected based on input from the speaker (e.g., the speaker has chosen a username associated with a given speaker model 170). In other aspects, a speaker model 170 is automatically selected based on a user identity associated with the speaker model 170 according to on one or more of: a most-frequently used onboarded user identity, a database position of the onboarded user identity, or a random choice of user identity. The speaker model 170 includes the speaker feature vector $f_{user}$, the weights used to produce the speaker feature vector from the phonetic representations and speaker representations for each frame, and the threshold from the training session used to identify and/or verify the user according to the speaker feature vector $f_{user}$.

Proceeding to OPERATION 330, a speaker feature vector $f_{speaker}$ is created from the utterance received in OPERATION 310 using the weights for the user model retrieved in OPERATION 320. Similarly to as in the training phase, the operational utterance is analyzed on a frame-by-frame basis to produce a phonetic representation of the utterance and a speaker representation of the utterance. The phonetic representations allow the system to understand what is being said in the utterance so that the weights given to the speaker representations in various frames may be applied accordingly. For example, a frame containing silence may be given no weight when attempting to recognize a user, whereas the pronunciations of a word recognized by the phonetic representations is given weight based on the onboarded users' known pronunciations. Consider two users—Alice and Bob—who each were onboarded for the text dependent phrase "Hello HAL" to invoke a personal digital assistant dubbed 'HAL'. If Alice were to pronounce the phrase as { ɛ'laʊ ɔl }) and Bob to pronounce it as {hə'loʊ hæl }), the combined phonetic and speaker representations allow for greater weights to be provided to the phonemes that differ between Alice and Bob's pronunciations of the same phrase. Similarly, speaker tendencies (e.g., accent patterns) are used in text-independent implementations.

Method 300 proceeds to DECISION 340, where it is determined whether the speaker's feature vector $f_{user}$ and the user's feature vector $f_{user}$ match according to the trained threshold from the speaker model 170.

In response to the speaker's feature vector not satisfying the threshold at DECISION 340, method 300 may return to OPERATION 320 to select another user's speaker model 170 to attempt recognition of the speaker via the utterance if the speaker recognition system 130 is configured to attempt multiple matches, and multiple users' speaker models 170 are maintained by the speaker recognition system 130. If the speaker recognition system 130 does not maintain multiple users' speaker models 170 or is configured to attempt only one recognition at a time, method 300 will proceed to OPERATION 350, where the speaker who provided the utterance in OPERATION 310 is rejected as a recognized speaker, and/or is identified as an un-recognized speaker. For example, if the speaker supplied a username and the utterance to log in to a system, and is not recognized as the user associated with the username, the speaker's log in attempt will be rejected. In various aspects, treating the speaker as unknown results in the speaker recognition system 130 in transmitting a notification to the user device 110 that the speaker is not a given user and should not be verified as the given user via utterance, that the speaker could not be identified, or that an onboarding session should be offered to the speaker.

In response to the speaker's feature vector satisfying the threshold, method 300 will proceed to one or more of OPERATIONS 360 and 370. At OPERATION 360, the speaker is identified as the user associated with the speaker model 170 retrieved in OPERATION 320. For example, the user device 110 may transmit several utterances to the speaker recognition system 130 while transcribing an audio recording, and each speaker's utterances are identified by the speaker recognition system 130 to differentiate the speakers in a written transcript of the audio recording. At OPERATION 370, the speaker is verified as the user associated with the speaker model retrieved in OPERATION 320 and the permissions for that user are verified on the user device 110. For example, a speaker may use an utterance to log in to an operating system of the user device 110, and the user's permissions are set according to the login.

Method 300 may conclude after OPERATIONS 350, 360, or 370.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
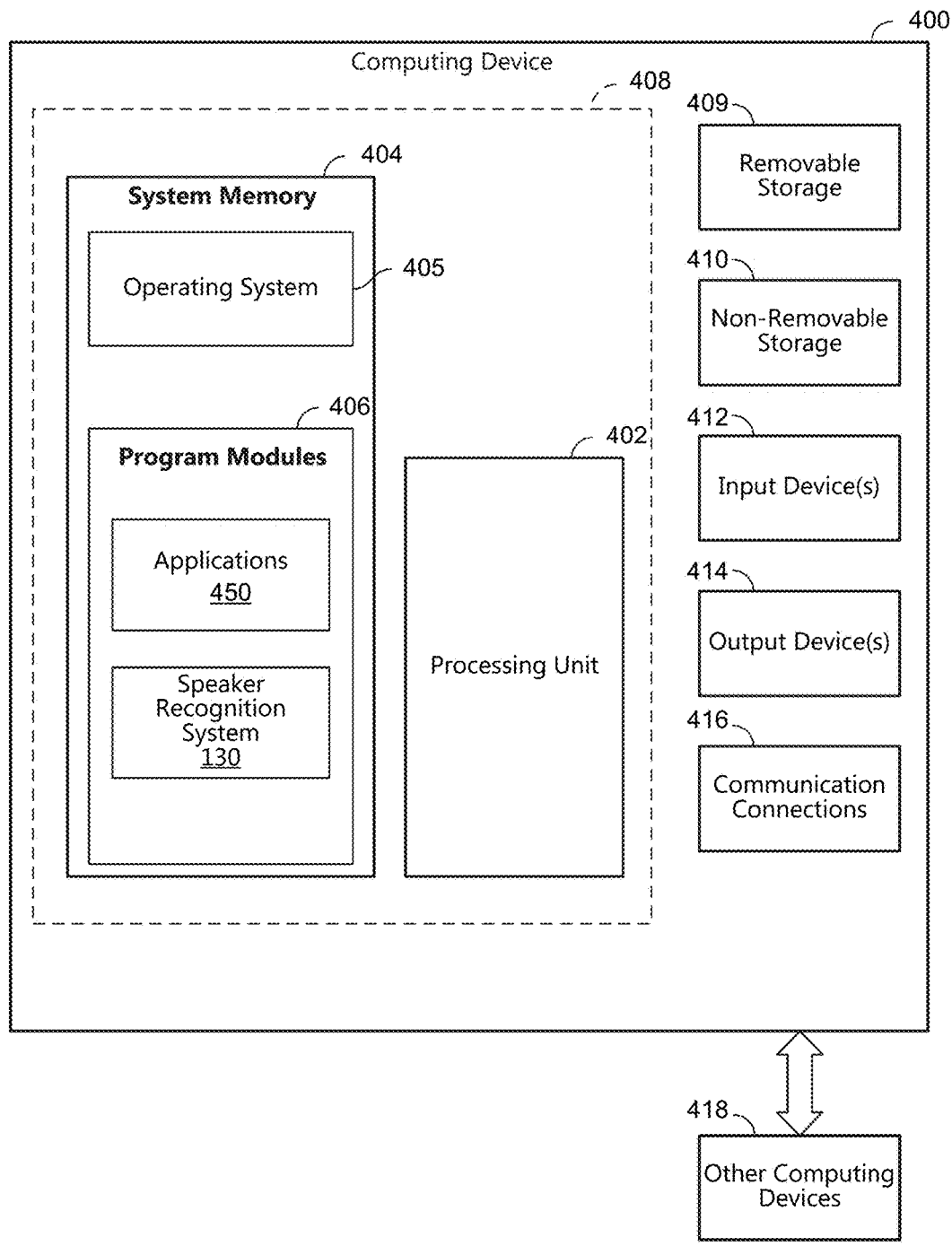
FIG. 4 is a block diagram illustrating example physical components of a computing device.
Figure 5A:
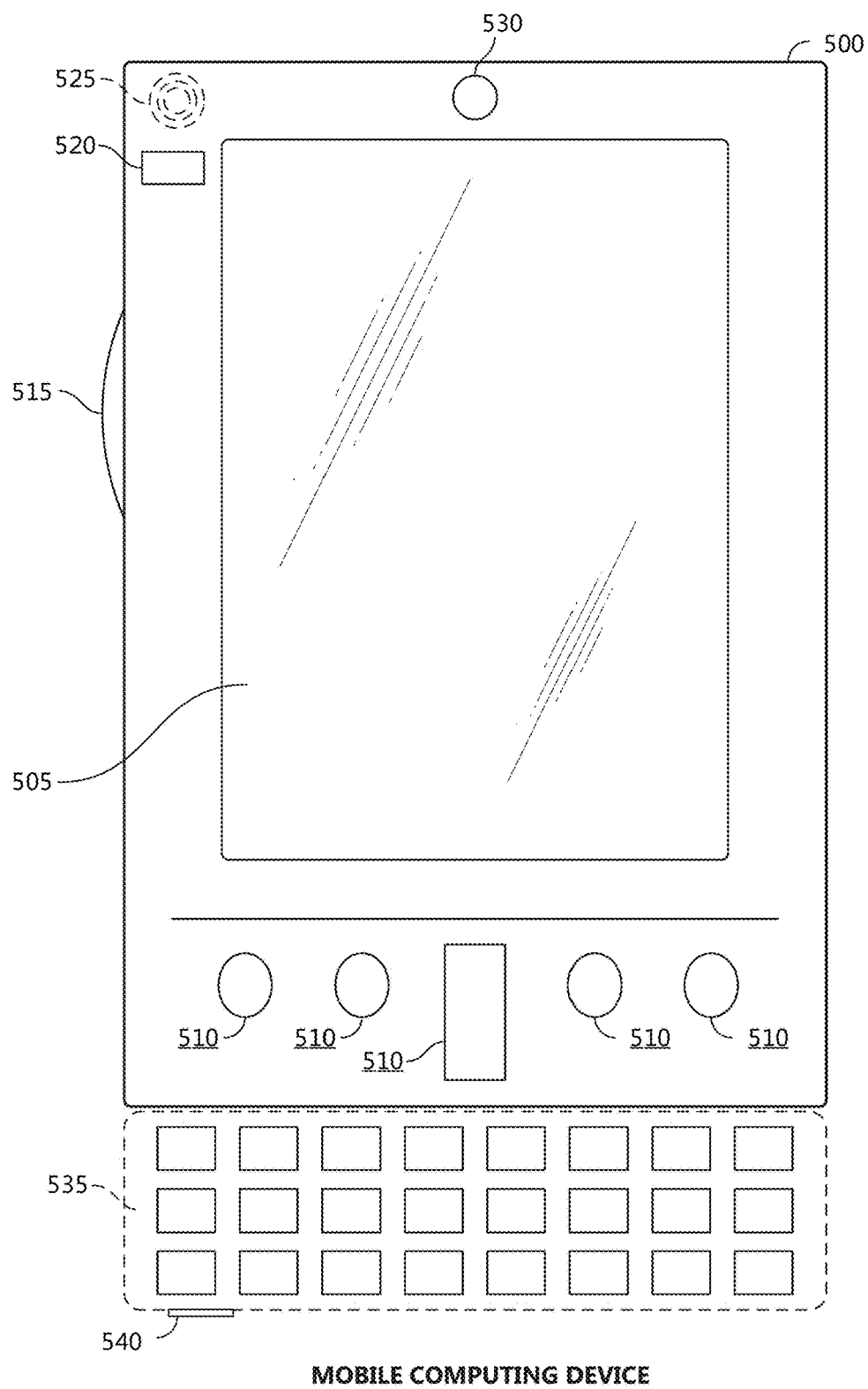
FIGS. 5A and 5B are block diagrams of a mobile computing device.
Figure 5B:
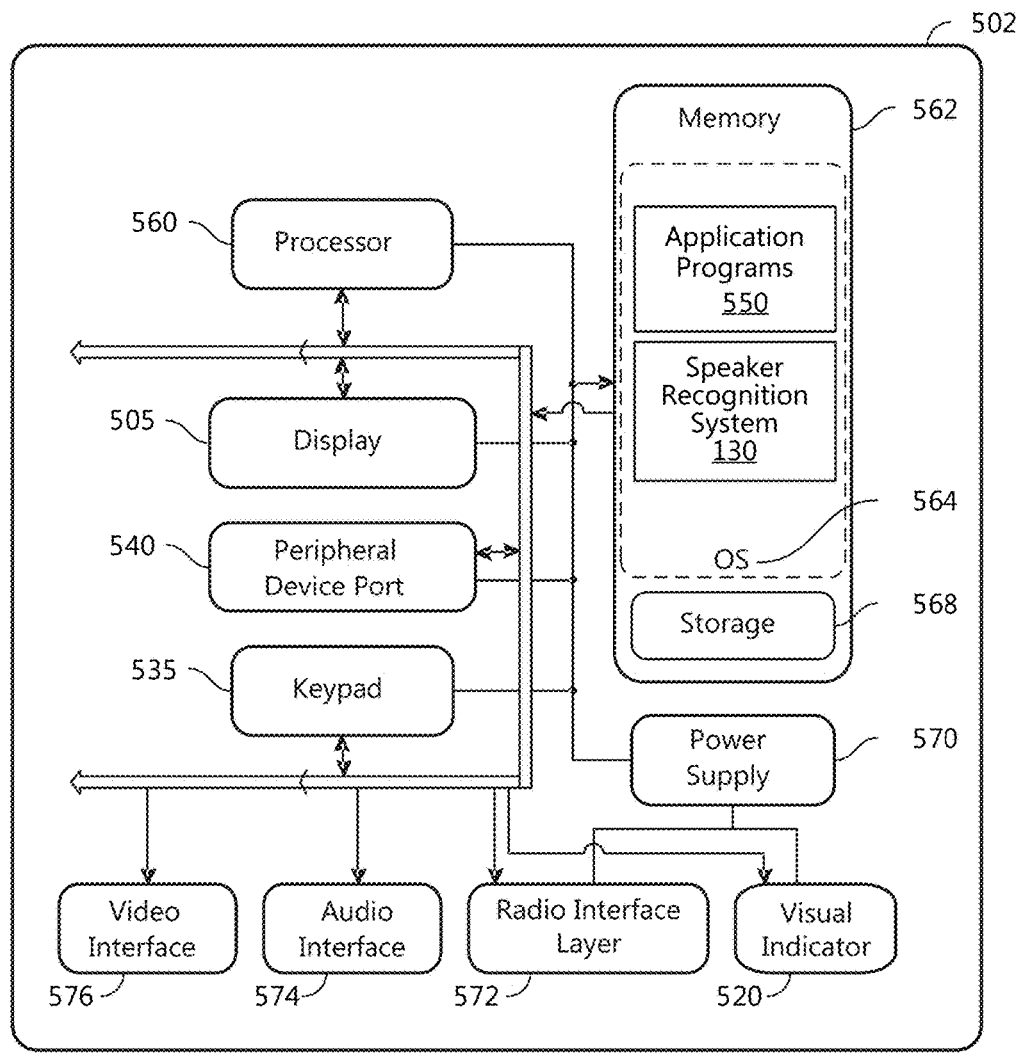
Figure 6:
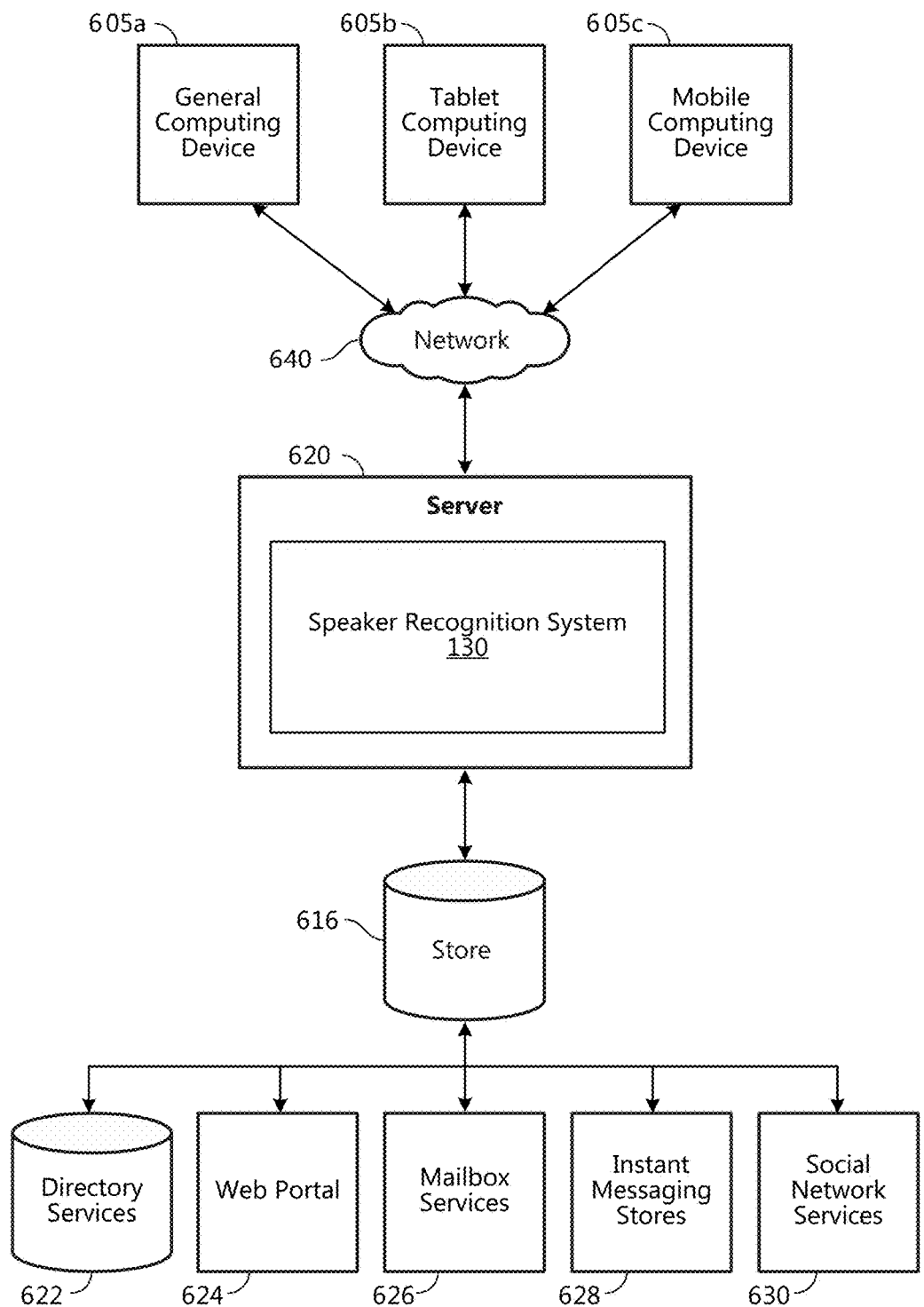
FIG. 6 is a block diagram of a distributed computing system.

FIGS. 4-6 and the associated descriptions provide a discussion of a variety of operating environments in which examples are practiced. However, the devices and systems illustrated and discussed with respect to FIGS. 4-6 are for purposes of example and illustration and are not limiting of a vast number of computing device configurations that are used for practicing aspects, described herein.

FIG. 4 is a block diagram illustrating physical components (i.e., hardware) of a computing device 400 with which examples of the present disclosure may be practiced. In a basic configuration, the computing device 400 includes at least one processing unit 402 and a system memory 404. According to an aspect, depending on the configuration and type of computing device, the system memory 404 comprises, but is not limited to, volatile storage (e.g., random access memory), non-volatile storage (e.g., read-only memory), flash memory, or any combination of such memories. According to an aspect, the system memory 404 includes an operating system 405 and one or more program modules 406 suitable for running software applications 450. According to an aspect, the system memory 404 includes speaker recognition system 130. The operating system 405, for example, is suitable for controlling the operation of the computing device 400. Furthermore, aspects are practiced in conjunction with a graphics library, other operating systems, or any other application program, and are not limited to any particular application or system. This basic configuration is illustrated in FIG. 4 by those components within a dashed line 408. According to an aspect, the computing device 400 has additional features or functionality. For example, according to an aspect, the computing device 400 includes additional data storage devices (removable and/or non-removable) such as, for example, magnetic disks, optical disks, or tape. Such additional storage is illustrated in FIG. 4 by a removable storage device 409 and a non-removable storage device 410.

As stated above, according to an aspect, a number of program modules and data files are stored in the system memory 404. While executing on the processing unit 402, the program modules 406 (e.g., speaker recognition system 130) perform processes including, but not limited to, one or more of the stages of the methods 200 and 300 illustrated in FIGS. 2 and 3. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 400 has one or more input device(s) 412 such as a keyboard, a mouse, a pen, a sound input device, a touch input device, etc. The output device(s) 414 such as a display, speakers, a printer, etc. are also included according to an aspect. The aforementioned devices are examples and others may be used. According to an aspect, the computing device 400 includes one or more communication connections 416 allowing communications with other computing devices 418. Examples of suitable communication connections 416 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. According to an aspect, any such computer storage media are part of the computing device 400. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a tablet personal computer, a laptop computer, and the like, with which aspects may be practiced. With reference to FIG. 5A, an example of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. According to an aspect, the display 505 of the mobile computing device 500 functions as an input device (e.g., a touch screen display). If included, an optional side input element 515 allows further user input. According to an aspect, the side input element 515 is a rotary switch, a button, or any other type of manual input element. In alternative examples, mobile computing device 500 incorporates more or fewer input elements. For example, the display 505 may not be a touch screen in some examples. In alternative examples, the mobile computing device 500 is a portable phone system, such as a cellular phone. According to an aspect, the mobile computing device 500 includes an optional keypad 535. According to an aspect, the optional keypad 535 is a physical keypad. According to another aspect, the optional keypad 535 is a "soft" keypad generated on the touch screen display. In various aspects, the output elements include the display 505 for showing a graphical user interface (GUI), a visual indicator 520 (e.g., a light emitting diode), and/or an audio transducer 525 (e.g., a speaker). In some examples, the mobile computing device 500 incorporates a vibration transducer for providing the user with tactile feedback. In yet another example, the mobile computing device 500 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 500 incorporates peripheral device port 540, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one example of a mobile computing device. That is, the mobile computing device 500 incorporates a system (i.e., an architecture) 502 to implement some examples. In one example, the system 502 is implemented as a "smart phone" capable of running one or more applications (e.g., browser, e-mail, calendaring, contact managers, messaging clients, games, and media clients/players). In some examples, the system 502 is integrated as a computing device, such as an integrated personal digital assistant (PDA) and wireless phone.

According to an aspect, one or more application programs 550 are loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. According to an aspect, speaker recognition system 130 is loaded into memory 562. The system 502 also includes a non-volatile storage area 568 within the memory 562. The non-volatile storage area 568 is used to store persistent information that should not be lost if the system 502 is powered down. The application programs 550 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

According to an aspect, the system 502 has a power supply 570, which is implemented as one or more batteries. According to an aspect, the power supply 570 further includes an external power source, such as an AC adapter or a powered docking cradle that supplements or recharges the batteries.

According to an aspect, the system 502 includes a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 550 via the operating system 564, and vice versa.

According to an aspect, the visual indicator 520 is used to provide visual notifications and/or an audio interface 574 is used for producing audible notifications via the audio transducer 525. In the illustrated example, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. According to an aspect, the system 502 further includes a video interface 576 that enables an operation of an on-board camera 530 to record still images, video stream, and the like.

According to an aspect, a mobile computing device 500 implementing the system 502 has additional features or functionality. For example, the mobile computing device 500 includes additional data storage devices (removable and/or non-removable) such as, magnetic disks, optical disks, or tape. Such additional storage is illustrated in FIG. 5B by the non-volatile storage area 568.

According to an aspect, data/information generated or captured by the mobile computing device 500 and stored via the system 502 are stored locally on the mobile computing device 500, as described above. According to another aspect, the data are stored on any number of storage media that are accessible by the device via the radio 572 or via a wired connection between the mobile computing device 500 and a separate computing device associated with the mobile computing device 500, for example, a server computer in a distributed computing network, such as the Internet. As should be appreciated such data/information are accessible via the mobile computing device 500 via the radio 572 or via a distributed computing network. Similarly, according to an aspect, such data/information are readily transferred between computing devices for storage and use according to well-known data/information transfer and storage means, including electronic mail and collaborative data/information sharing systems.

FIG. 6 illustrates one example of the architecture of a system for speaker recognition as described above. Content developed, interacted with, or edited in association with the speaker recognition system 130 is enabled to be stored in different communication channels or other storage types. For example, various documents may be stored using a directory service 622, a web portal 624, a mailbox service 626, an instant messaging store 628, or a social networking site 630. The speaker recognition system 130 is operative to use any of these types of systems or the like for recognizing speakers, as described herein. According to an aspect, a server 620 provides the speaker recognition system 130 to clients 605*a,b,c*. As one example, the server 620 is a web server providing the speaker recognition system 130 over the web. The server 620 provides the speaker recognition system 130 over the web to clients 605 through a network 640. By way of example, the client computing device is implemented and embodied in a personal computer 605*a*, a tablet computing device 605*b* or a mobile computing device 605*c* (e.g., a smart phone), or other computing device. Any of these examples of the client computing device are operable to obtain content from the store 616.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A system providing speaker recognition, comprising:
   a first processor; and
   a memory storage device including instructions that when executed by the first processor enable the system to:
   receive an onboarding utterance from a user;
   select, from a training pool, training utterances from other speakers based on the onboarding utterance;
   train an attention model and neural network based on the onboarding utterance and the training utterances to discriminate utterances from the user against utterances from other speakers;
   create a user speaker model based on the onboarding utterance and the trained attention model and neural network by:
      producing a frame-by-frame phonetic representation of the onboarding utterance; and
      producing a frame-by-frame speaker representation of the onboarding utterance, wherein the trained attention model and neural network weight the frame-by-frame speaker representation according to the frame-by-frame phonetic representation;
   receive an operational utterance from an unknown speaker; and
   create an unknown speaker model based on the operational utterance and the trained attention model and neural network;
   wherein the user speaker model and the unknown speaker model are suitable for implementation by the first processor or a second processor to:
      determine whether the unknown speaker model matches the user speaker model; and
      in response to determining that the unknown speaker model matches the user speaker model, recognize the unknown speaker as the user.

2. The system of claim 1, wherein the training utterances are selected from the training pool based on a similarity between the training utterances and the onboarding utterance.

3. The system of claim 1, wherein the unknown speaker is recognized by verifying the unknown speaker as the user, and the verification further comprises:
   receiving, in association with the operational utterance, a user identifier associated with the user, wherein the user speaker model for the user is selected based on the received user identifier.

4. The system of claim 1, wherein the unknown speaker is recognized by identifying the unknown speaker as the user from an audio signal including utterances from several speakers.

5. The system of claim 1, wherein the frame-by-frame phonetic representation provides a probability of phonemes occurring in a given frame of the onboarding utterance.

6. The system of claim 5, wherein the system is text-independent in production of the frame-by-frame phonetic representation, and wherein the probability of phonemes include probabilities for each phoneme in a given language.

7. The system of claim 1, wherein the frame-by-frame phonetic representation of the onboarding utterance is corresponded to the frame-by-frame speaker representation of the onboarding utterance for joint frame-by-frame analysis in the trained attention model and neural network.

8. A method for speaker recognition, comprising:
   receiving an onboarding utterance from a user;
   selecting, from a training pool, training utterances from other speakers based on the onboarding utterance;
   training an attention model and neural network based on the onboarding utterance and the training utterances to discriminate utterances from the user against utterances from other speakers; and
   creating a user speaker model based on the onboarding utterance and the trained attention model and neural network by:
      producing a frame-by-frame phonetic representation of the onboarding utterance; and
      producing a frame-by-frame speaker representation of the onboarding utterance, wherein the trained attention model and neural network weight the frame-byframe speaker representation according to the frame-by-frame phonetic representation;

wherein, responsive to a receipt of an operational utterance from an unknown speaker, the user speaker model is configured to recognize the unknown speaker as the user.

9. The method of claim 8, further comprising:
selecting the training utterances from the training pool based on a similarity between the training utterances selected and the onboarding utterance.

10. The method of claim 8, further comprising:
creating an unknown speaker model based on the operational utterance received from the unknown speaker and the trained attention model and neural network, wherein the user speaker model and the unknown speaker model are suitable for implementation to:
  determine whether the unknown speaker model matches the user speaker model; and
  in response to determining that the unknown speaker model matches the user speaker model, recognize the unknown speaker as the user by:
    verifying the unknown speaker as the user, which further comprises:
      receiving, in association with the operational utterance, a user identifier associated with the user; and
      selecting, based on the received user identifier, the user speaker model to match against the unknown speaker model.

11. The method of claim 10, wherein the operational utterance is included in an audio signal including utterances from several speakers, and the unknown speaker is recognized by identifying the unknown speaker against one or more user models associated with onboarded users.

12. The method of claim 8, wherein creating the user speaker model further comprises:
corresponding the frame-by-frame phonetic representation and the frame-by-frame speaker representation by frames.

13. The method of claim 8, wherein the frame-by-frame phonetic representation provides a probability of phonemes occurring in a given frame of the onboarding utterance.

14. The method of claim 13, wherein the frame-by-frame phonetic representation is text-dependent, wherein the onboarding utterance comprises a key phrase, and wherein the probability of phonemes include probabilities for each phoneme defined in the key phrase.

15. A computer readable storage device including instructions that when executed by a processor provide for speaker recognition, comprising:
receiving an operational utterance from an unknown speaker; and
creating an unknown speaker model based on the operational utterance and a trained attention model and neural network, wherein the unknown speaker model is suitable for implementation to:
  determine whether the unknown speaker model matches a user speaker model developed according to the trained attention model and neural network for a particular user, wherein the user speaker model is developed based on an onboarding utterance received from the particular user and the trained attention model and neural network by:
    producing a frame-by-frame phonetic representation of the onboarding utterance; and
    producing a frame-by-frame speaker representation of the onboarding utterance, wherein the trained attention model and neural network weight the frame-by-frame speaker representation according to the frame-by-frame phonetic representation; and
  in response to determining that the unknown speaker model matches the user speaker model, recognize the unknown speaker as the particular user.

16. The computer readable storage device of claim 15, wherein the user speaker model is developed based on the onboarding utterance received from the particular user and the trained attention model and neural network further by:
corresponding the frame-by-frame phonetic representation and the frame-by-frame speaker representation by frames.

17. The computer readable storage device of claim 16, wherein the unknown speaker is recognized by verifying the unknown speaker as the particular user, and the verification further comprises:
receiving, in association with the operational utterance, a user identifier associated with the particular user, wherein the user speaker model for the particular user is selected based on the received user identifier.

18. The computer readable storage device of claim 16, wherein the unknown speaker is recognized by identifying the unknown speaker as the particular user from an audio signal including utterances from one or more speakers.

19. The computer readable storage device of claim 16, wherein the trained attention model and neural network is trained based on a plurality of onboarding utterances received from the particular user and a plurality of training utterances from other speakers selected from a training pool based on the plurality of onboarding utterances to discriminate utterances from the particular user against utterances from other speakers;
wherein the plurality of training utterances are selected from the training pool based on a similarity between the plurality of training utterances and the plurality of onboarding utterances.

* * * * *